Nov. 30, 1954  L. G. POLLARD  2,695,925
HIGH-SPEED FACSIMILE TRANSMITTER
Filed Feb. 29, 1952  9 Sheets-Sheet 2

INVENTOR.
L. G. POLLARD
BY
*N. F. Presson*
ATTORNEY

Nov. 30, 1954     L. G. POLLARD     2,695,925
HIGH-SPEED FACSIMILE TRANSMITTER

Filed Feb. 29, 1952     9 Sheets-Sheet 4

INVENTOR.
L. G. POLLARD
BY
ATTORNEY

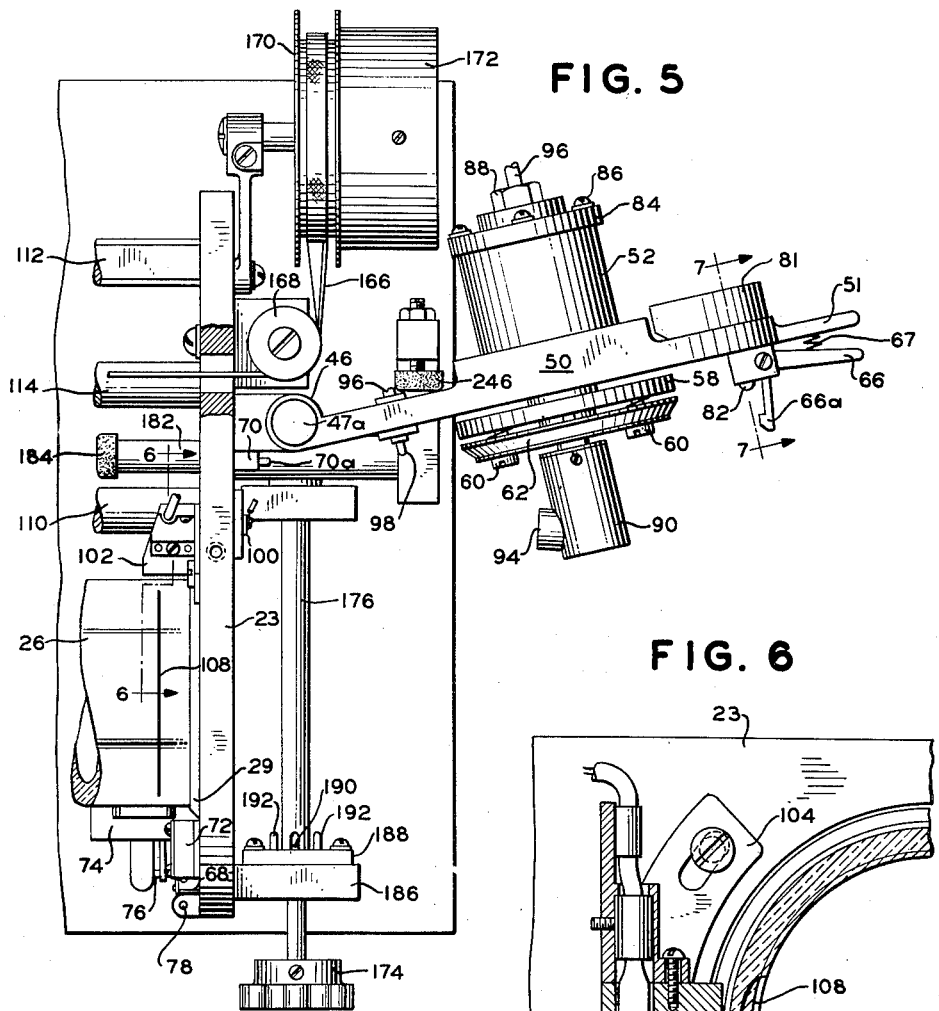

Nov. 30, 1954   L. G. POLLARD   2,695,925
HIGH-SPEED FACSIMILE TRANSMITTER
Filed Feb. 29, 1952   9 Sheets-Sheet 7

*INVENTOR.*
L. G. POLLARD

BY

ATTORNEY

Nov. 30, 1954 L. G. POLLARD 2,695,925
HIGH-SPEED FACSIMILE TRANSMITTER
Filed Feb. 29, 1952 9 Sheets-Sheet 8

INVENTOR.
L. G. POLLARD
BY
ATTORNEY

Nov. 30, 1954 L. G. POLLARD 2,695,925
HIGH-SPEED FACSIMILE TRANSMITTER
Filed Feb. 29, 1952 9 Sheets-Sheet 9
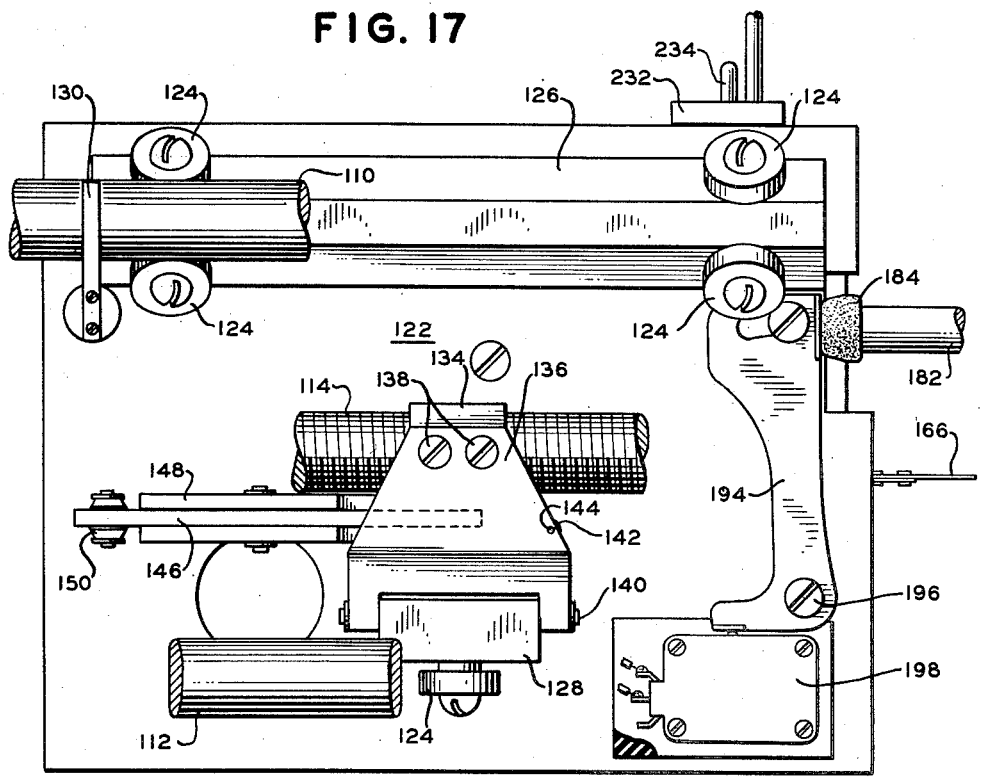
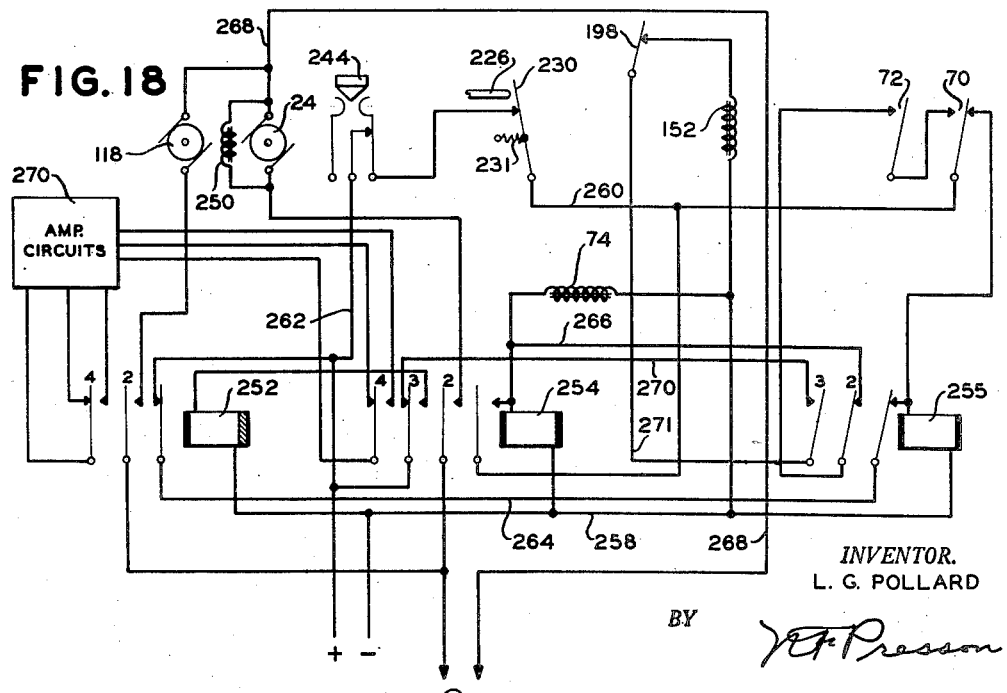
*INVENTOR.*
L. G. POLLARD
BY
*J. F. Presson*
ATTORNEY

… … …

United States Patent Office 2,695,925
Patented Nov. 30, 1954

2,695,925

HIGH-SPEED FACSIMILE TRANSMITTER

Leon G. Pollard, Southampton, N. Y., assignor to The Western Union Telegraph Company, New York, N. Y., a corporation of New York Application February 29, 1952, Serial No. 274,174

14 Claims. (Cl. 178—7.1)

This invention relates to telegraph facsimile transmission apparatus and more particularly to novel and improved structural features in a facsimile transmitter which enable it to transmit subject matter such as pictures and messages at very high speeds.

In a high speed transmitter of the character disclosed a hollow message cylinder, which has a transparent wall of glass, Lucite or the like, is rotated at synchronous speed during a transmitting operation, and a traveling pickup carriage is caused to travel at constant speed longitudinally along the outer surface of the transparent cylinder, thereby to effect a resultant scanning movement. A message to be transmitted is rolled up and inserted through an open outer end of the transparent cylinder and placed inside with the subject matter facing outwardly so that it may be scanned optically through the transparent wall. The cylinder is then rotated at a suitable speed, such as 1800 R. P. M., at which speed centrifugal force presses the message blank firmly against the inside surface of the cylinder. A carriage which supports a light projection and photoelectric pickup system then travels along a track parallel to the axis of the rotating message cylinder thereby scanning the message in successive lines at a desired rate such as 30 lines per second. If the speed of the carriage is one-quarter of an inch per second this results in a definition of 120 scanning lines per inch.

Among the objects of the invention are the provision of: A transmitter unit in which the various component parts are especially adapted to operate reliably at high scanning speeds; suitable gate or closure structure for the outer end of the transmitting cylinder to facilitate the insertion and removal of message blanks and to control the operation of the transmitter; bearing structure carried by the transmitter gate for rotatably supporting the outer end of the transmitting cylinder in a manner to enable the rotation thereof at high scanning speeds without appreciable deviation from its proper axis of rotation; and suitably disposed light projection and photoelectric pick up apparatus for generating signals for phasing and other purposes.

An additional object is to provide a high speed transmitter which is adapted to be used either singly, or with another transmitter to form a pair successively operative in the manner disclosed in an application of Pollard et al., Serial No. 261,461, filed December 13, 1951, assigned to the assignee of the instant case, the disclosure of which application is incorporated herein by reference.

Other objects and advantages will be apparent from the following detailed description of one illustrative form of the invention, taken in connection with the accompanying drawings in which:

Figs. 1 and 2 together comprise a top plan view of a transmitter unit in accordance with the invention;

Figs. 3 and 4 together comprise a front view in elevation of the unit of Figs. 1 and 2;

Fig. 5 is a fragmentary top view of the right hand end of the transmitter unit, showing the transmitter gate in open position;

Fig. 6 is a sectional view taken along the line 6—6 of Fig. 5, showing mounting details of one of the photocell units employed;

Fig. 7 is a sectional view taken along the line 7—7 of Fig. 5, showing details of thumb latch mechanism of the transmitter gate;

Figure 2:
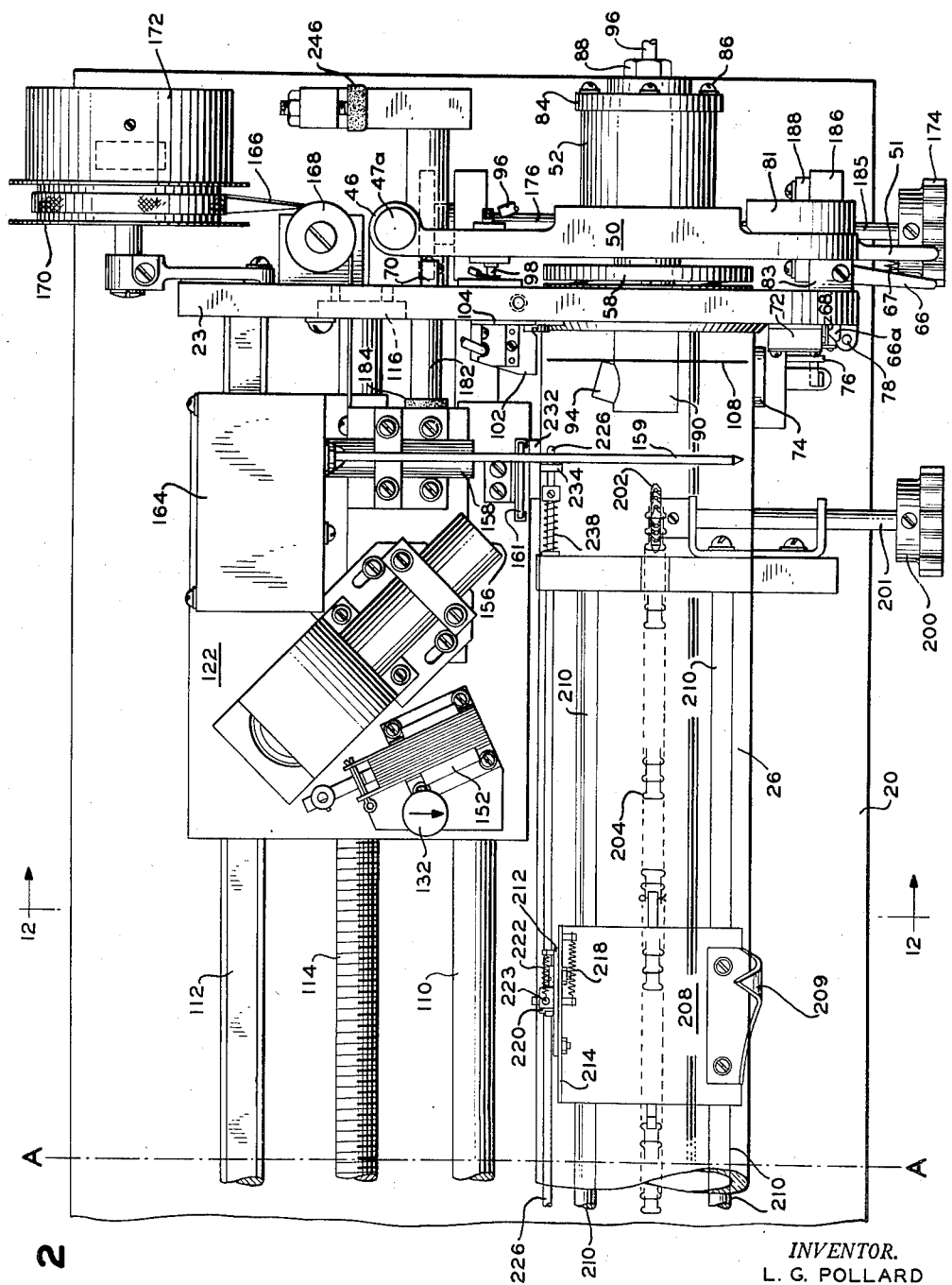
Figure 8:
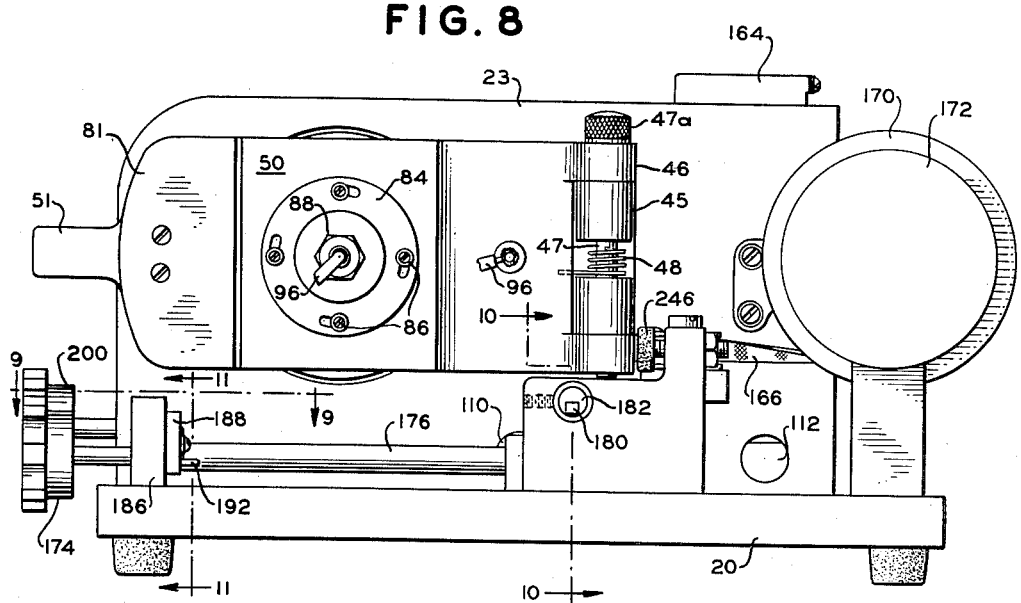
Fig. 8 is an end view in elevation of the right hand end of the transmitter unit.
Figure 9:
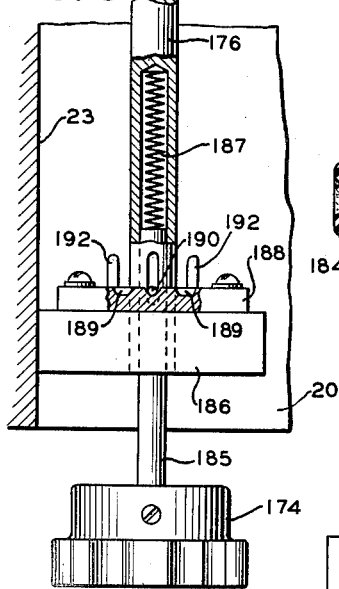
Figure 10:
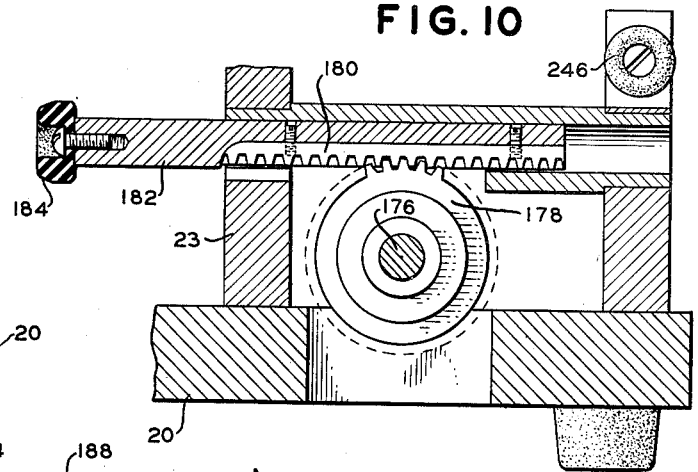
Figure 11:
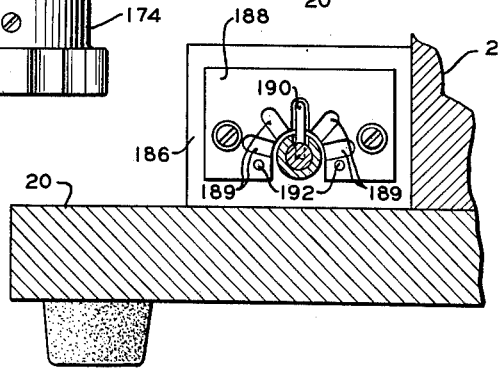
Figure 12:
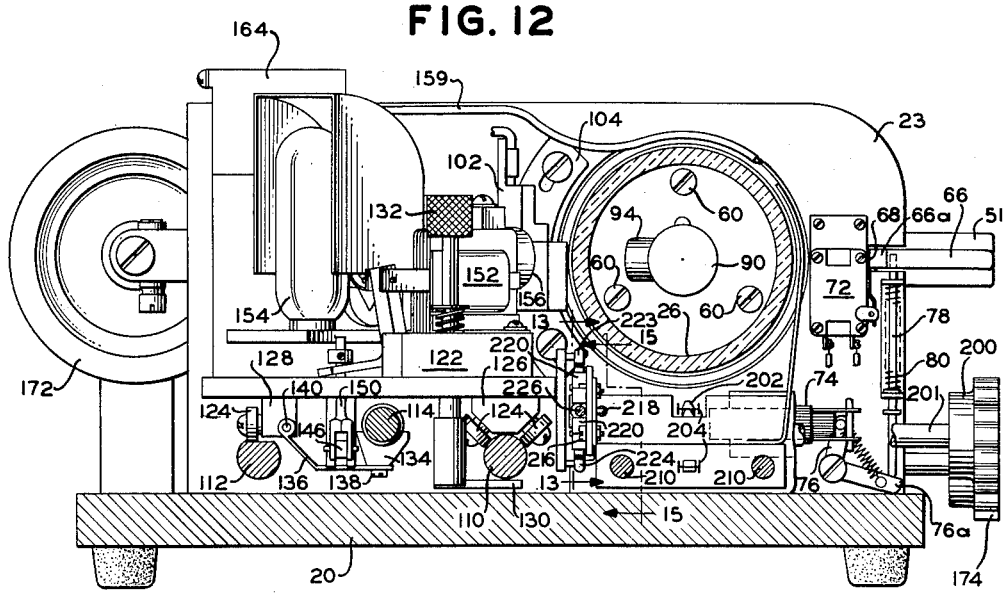
Figure 13:
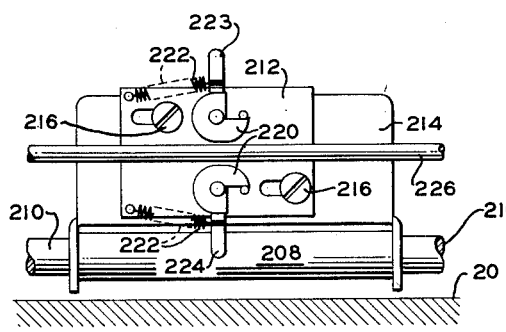
Figure 14:
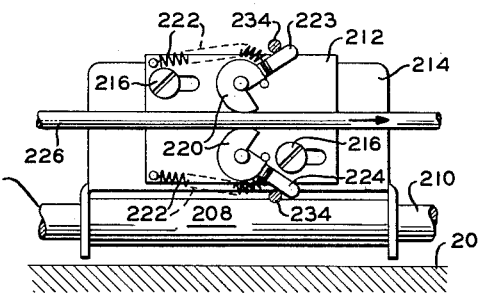
Figure 15:
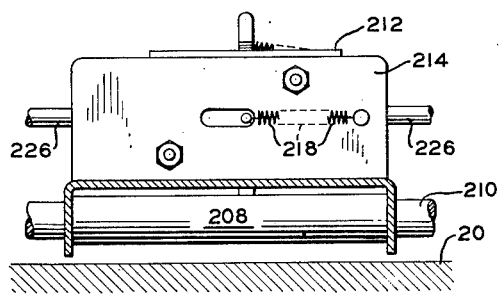
Figure 16:
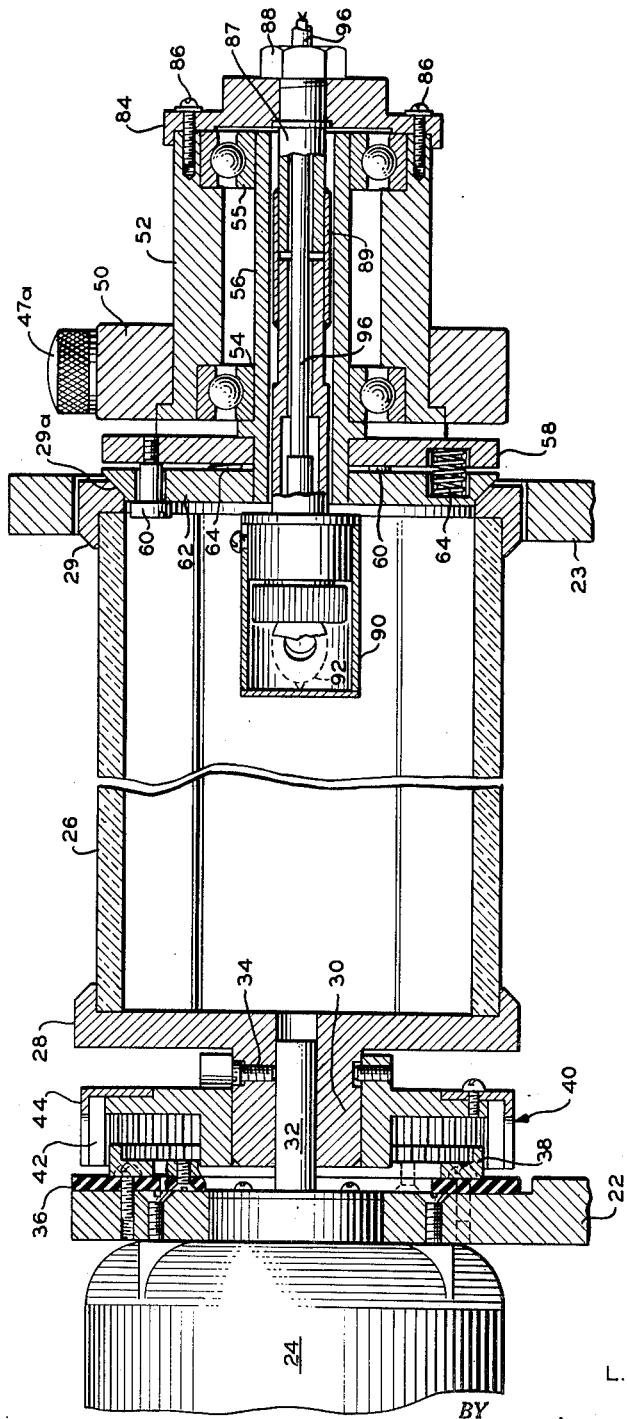

Figs. 9, 10 and 11 are sectional views respectively taken along the lines 9—9, 10—10 and 11—11 of Fig. 8, showing details of a start-of-message position control device employed in the transmitter;

Fig. 12 is a sectional view taken along the line 12—12 of Fig. 2;

Fig. 13 is a section taken along the line 13—13 of Fig. 12, showing end-of-message carriage trip mechanism;

Fig. 14 shows the mechanism of Fig. 13 in actuated position;

Fig. 15 is a section taken along line 15—15 of Fig. 12, showing another view of the mechanism of Fig. 13;

Fig. 16 is a horizontal section showing details of the drive and bearing structures for the message cylinder of the transmitting unit;

Fig. 17 is a bottom view of certain details of the pickup carriage feed mechanism; and Fig. 18 is a schematic wiring diagram of certain control circuits which may be employed with the transmitter unit.

Figure 1:
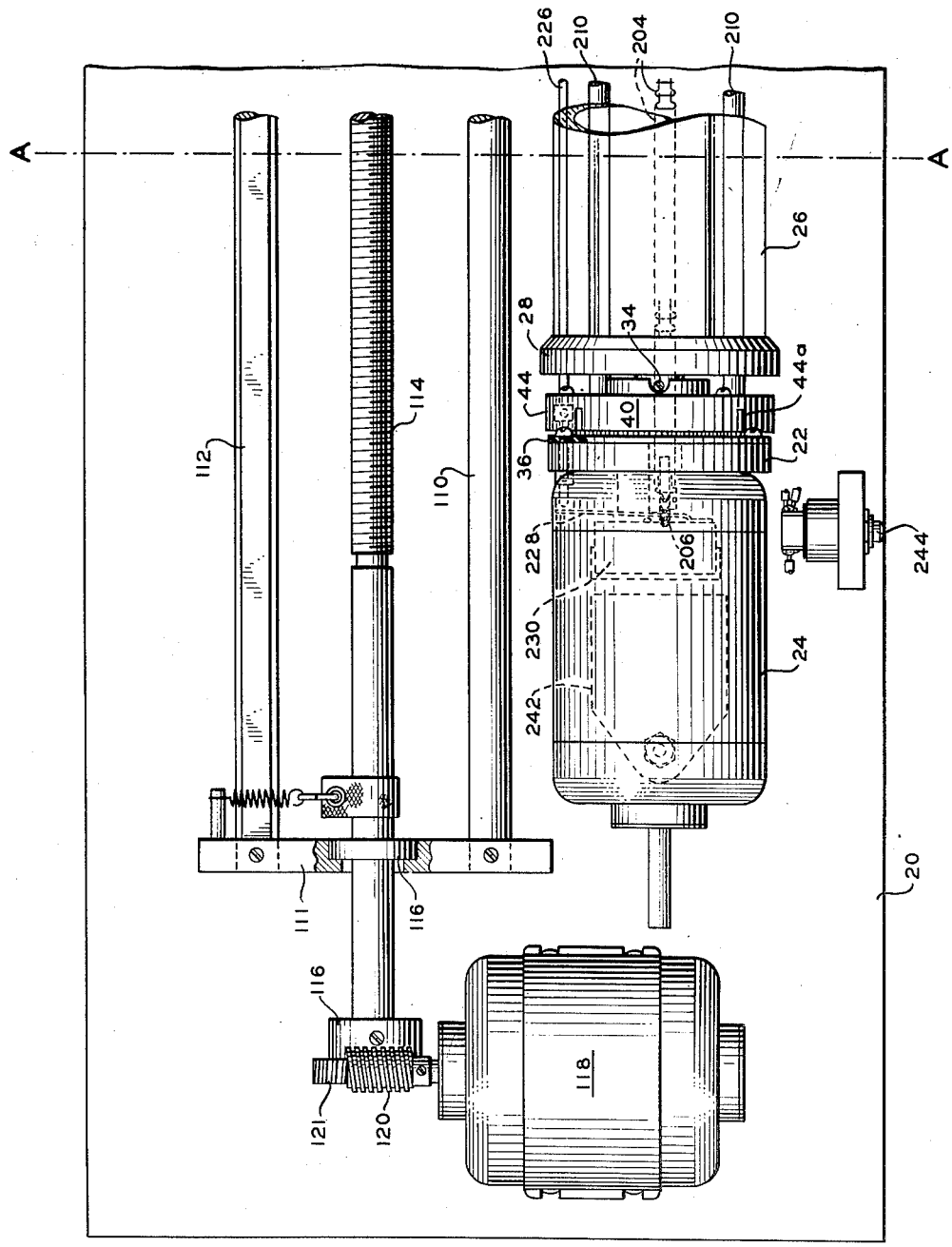
Figure 3:
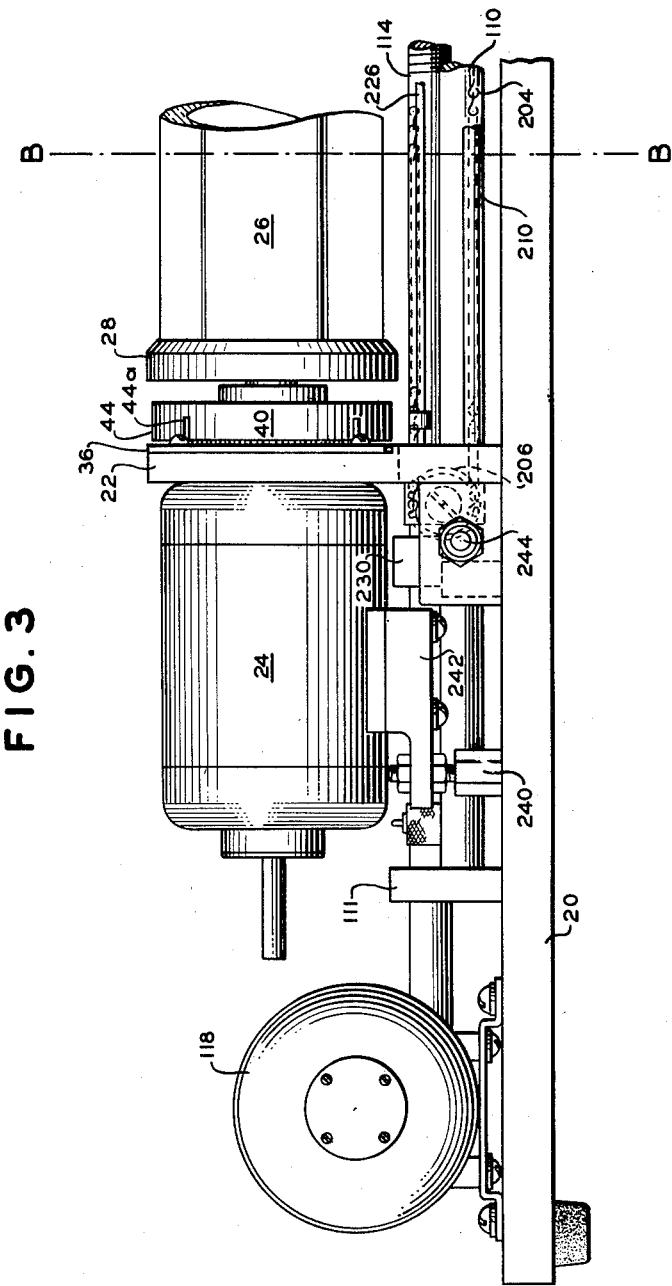
Figures 4, 4A:
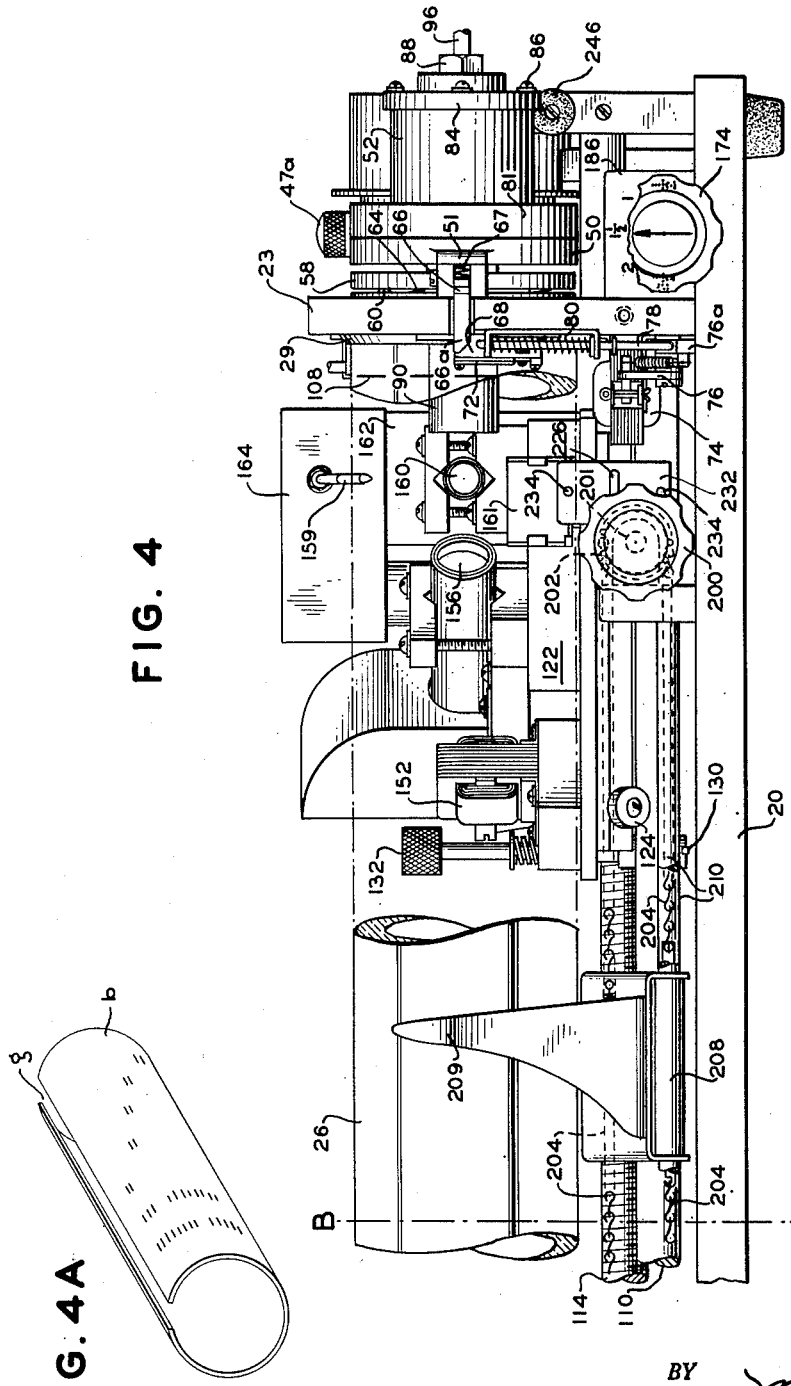
Fig. 4A illustrates a message blank rolled for insertion in the message cylinder of the unit.

The transmitter unit is shown in Figs. 1 and 2 which comprise top plan views of the left and right hand portions, respectively, and in Figs. 3 and 4 which comprise front views in elevation of the left and right hand portions, respectively, of the unit.

Referring to Figs. 1 and 3, an upright 22 is rigidly attached to a supporting base 20 and supports the cylinder-driving motor 24. This preferably is a synchronous (salient-pole) type, 60 cycle, 1800 R. P. M. motor. A transparent cylinder 26 is fitted with a flange 28 that receives the left hand or inner end of the cylinder with a tight fit, so that the flange is rigidly attached to the cylinder. The flange is provided with a hub 30, Fig. 16, which fits tightly on the motor shaft 32 with means 34 provided for locking it firmly to the shaft. The foregoing provides a bearing structure for the inner end of the cylinder and enables the cylinder to be rotated about its axis at a predetermined speed during transmission of a message.

Mounted on the face of the upright plate member 22, as seen in Fig. 16, is an insulating plate 36. This insulating plate supports the stator section 38 of a 1440 cycle variable capacity-type tone generator 40. This tone generator, which forms part of a motor stabilization circuit, is fully described together with its circuit in the co-pending application of F. T. Turner et al., Serial No. 245,544, filed September 7, 1951, and assigned to the assignee of the instant case. Briefly, the generator comprises a 48-tooth ring which is insulated from ground by the plate 36 and is mounted concentric with the motor shaft 32. The mounting plate 36 is provided with over-size attachment holes to allow for slight adjustment of concentricity. The hub 30 of the cylinder flange supports the tone generator rotor 42 with means for adjustment of this rotor rotationally around the hub. This rotor is a 48-tooth annular ring which, in assembly, slips over the stator section with about .007 inch clearance between the rotor and stator. The tone generator rotor is provided with a tight fitting cover 44 to eliminate the audible siren effect which would otherwise be produced when the generator is running. Four slots 44a, Figs. 1 and 3, in this cover, spaced 90° apart and coinciding with slots in the rotor, provide access for inserting gaging strips of a definite thickness for setting the stator section concentric with the rotor.

The right hand or front end of the transparent cylinder is fitted with an annular flange 29, Fig. 16, which is firmly attached to the cylinder. The inside diameter of this flange is the same as the inside diameter of the cylinder and the outer edge of this flange is provided with a suitable taper, such as a 45° taper indicated at 29a. The outside diameter of the flange 29 is slightly smaller than the circular aperture in the upright end support or plate member 23.

Swinging from the support member 23, Figs. 2, 5 and 8, by means of a hinge 46 is a movable gate 50 having a handle 51. This gate, which is hereinafter referred to as a transmitter gate, is fitted with a ball-bearing housing 52 that contains two large ball-bearings 54, 55, Fig. 16, through which passes a hollow rotary shaft 56. The inside end of this shaft supports a rotary bearing, or live center, plate 58, Figs. 5 and 16, and held to this supporting plate by three shoulder screws 60 is a tapered bearing plate 62 which provides a live center contact plate. This bearing plate 62 fits loosely to the shaft, and counterbored holes in this plate around the shoulder screws 60 limit the movement of the plate 62. Three compression springs 64 urge the plate 62 into contact with the tapered surface 29a of the cylinder ring 29. It will be seen that as the transmitter gate is swung closed, the tapered bearing plate 62 will engage the taper 29a on the end of flange 29 and thus provide a front bearing for the rotary cylinder.

The transmitter gate 50 is provided with a thumb catch 66, 66a, and a spring 67, Figs. 2, 4 and 5, which thumb catch engages a catch plate 68, Fig. 4, when the gate is closed. Closing the gate actuates two snap switches 70 and 72, Figs. 2 and 5, the purpose of which is hereinafter set forth in connection with the circuit shown in Fig. 18. Also, as disclosed in the description of the latter figure, an electrical circuit is closed to energize a solenoid magnet 74, Figs. 4 and 5, the armature of which magnet, through a link motion 76 and 76a, raises a lock pin 78, Fig. 4, up behind the thumb catch 66a. A coil spring 80 returns this lock pin to its normal position when the solenoid magnet is deenergized. Figs. 2, 4 and 8 show the gate in closed position, and Fig. 5 shows the gate in open position. Fig. 4 shows the lock pin 78 in its normal (unlocked) position with no power applied to the solenoid magnet 74. A weight 81 is secured, as by screws, to the transmitter gate, and the inertia thereof facilitates full closing of the gate. In Fig. 7 is shown a spring pressed ball and ball retainer assembly 82 and 83 which prevents play or vibration in the transmitter gate when in closed position.

The bearing housing 52, Fig. 16, is fitted with an end cap 84 which is attached to it with four screws 86 through slots. Attached to this end cap is a hollow post 87 held firmly by means of a nut 88. This hollow post extends through the hollow rotary shaft 56 and supports on its opposite end a phasing lamp housing 90. This lamp housing contains a prefocused type Mazda lamp 92 and a projection lens in a tube 94, Figs. 2, 5 and 12. One side of the lamp is connected to ground potential while the other connection 96, Fig. 16, is brought out through the hollow post 87 and fastened to a spring terminal 98, Fig. 5. This spring terminal makes contact with the live connection plate 100, Fig. 5, and the lamp 92 is thereby lighted only when the transmitter gate is in its closed position. Referring again to Fig. 16, a sleeve member 89 is provided to enable lateral adjustment of the phasing lamp 92, as viewed in the figure, and that section of the post 87 on which the lamp is mounted, after which the sleeve member 89 is brazed or otherwise firmly secured to the two sections which form the post 87.

Mounted on the upright end plate 23, Figs. 5 and 6, is a photocell housing 102 which is so mounted that the inside surface of the housing is close to the wall of the transparent message cylinder. Through the inside wall of this housing is a small hole 103, Fig. 6, upon which light from the Mazda lamp contained in lamp housing 90 is focused by means of a projection lens positioned in the end of tube 94, through the transparent wall of the message cylinder. Means is provided by the adjustable photocell mounting plate 104 for a slight amount of orientation of the photocell housing about the axis of the message cylinder. Within the photocell housing 102 and supported in a socket contained in the removable part of the housing is a small photocell 106 mounted in such position that the active surface of the cell is opposite the light entrance hole 103 on the front of the housing.

Messages to be transmitted are on message blanks not quite as wide as the inside circumference of the transparent cylinder. For example, if the inside circumference of a cylinder is 8⅝", the width of the message blanks should not be greater than 8½". The cylinder is loaded, through the front end, by opening the transmitter gate, as seen in Fig. 5, rolling up the message blank b in the manner shown in Fig. 4A, to a diameter somewhat smaller than the inside diameter of the cylinder, and sliding the blank into the cylinder to a distance such that the right hand end of the blank, as it lies in the cylinder and as viewed in Fig. 5, coincides with the scribed line 108 around the cylinder near the front end thereof. When the transmitter gate is closed and the cylinder gets up to speed, there will be a ⅛" gap between the edges of the blank if the blank width is 8½". If the blank is narrower (which is acceptable) the gap will be wider.

It will be seen from a consideration of Figs. 4A and 6 that light from the phasing lamp can not fall on the photocell 106 as long as the light is cut off by the message blank, and the light will fall on the photocell only through the gap g between the edges of the message blank. This will result in a short pulse of light for each revolution of the message cylinder. These pulses, termed "phasing pulses," occur at the rate of 30 per second when the cylinder is running at synchronous speed of 1800 R. P. M., and are utilized for phasing the facsimile recorder at the opposite end of the circuit. After phasing of the recorder is accomplished and transmission of the message begins, these pulses are known as "blanking pulses" and through suitable electrical circuits, in the manner disclosed in detail in the aforesaid Pollard et al. application, serve to cut off the emitted energy from the transmitter while the message pickup photocell, hereinafter referred to, is scanning the gap between the edges of the message blank.

Figs. 1 and 2 show two carriage rails 110 and 112 which are rigidly mounted, in rail bearing plate 111 and in plate 23, exactly parallel with the axis of the message cylinder. The front rail 110 is round and the rear rail 112 is flat on top. Midway between these rails is a lead screw 114 supported in ball bearings 116 at each end. The lead screw is driven by a synchronous motor 118 through a worm 120 and a worm wheel 121. The pickup carriage 122 is shown in detail in Figs. 4, 12 and 17, Fig. 4 being a front view and Fig. 17 a view of the underside of the carriage. The carriage is supported on the carriage rails 110 and 112 by five ball bearings 124. Two sets of bearings at the front of carriage 122, Fig. 12, are mounted at a 90° angle and ride on the front round carriage rail 110, these bearings being mounted on a V-shaped block 126. The single ball bearing 124 supported by mounting block 128 rides on the rear flat carriage rail 112. With this arrangement, a definite alignment of the carriage with the axis of the message cylinder is accomplished as the carriage travels back and forth along the rails. Gravity serves to hold the carriage firmly to the rails. A hold-down bar 130 operated by a thumb knob 132 is swung underneath the front carriage rail, with a slight amount of clearance, after the carriage is in position, and serves to eliminate the slight bounce which would otherwise occur at the end of the retracting travel of the carriage.

A half-nut 134, Fig. 12, is loosely mounted to a supporting arm 136 by two shoulder screws 138. The supporting arm swings on a pin 140 which is mounted on the block 128. A coil spring 142, Fig. 17, hooked through a hole 144 in the supporting arm 136, is fastened at the other end to the underside of the carriage bed and holds the half-nut up against the underside of the lead screw during the scanning period. The half-nut retracting mechanism comprises a retracting bar 146, Fig. 17, pivoted on a bearing pin through block 148 and connected by means of a link 150 with the armature of a solenoid magnet 152, Fig. 2. When this magnet is energized, the half-nut supporting arm 136 is depressed and disengages the half-nut from the lead screw 114.

The light projection system for illuminating the message comprises a projection-type Mazda lamp 154, Fig. 12, and lens system 156, Fig. 4, which projects a small spot of high intensity light on the message blank at the point where scanning takes place. The pickup lens system 158, Figs. 2 and 4, picks up the reflected light from the message blank and projects it through a dissecting apertured plate, in known manner, onto a multiplier type photocell 160 mounted within the enclosure 162. Associated with the photocell is a preamplifier contained in the enclosure 164. A pointer 159 mounted on the enclosure casing 164 gives an indication of the instant scanning position of the photocell and also enables the start-of-message position readily to be determined. A static eliminator 161 of well-known type prevents the accumulation of a static charge on the mechanism.

A retracting belt 166, Figs. 2 and 8, hooks onto the carriage and after passing around an idler pulley 168, Fig. 2, is wound around a typewriter carriage return spring drum 170. The action of the belt and spring is to return the pickup carriage to its initial position at the end of a scanning cycle. To prevent a too rapid return of the carriage, a governor mechanism 172 is coupled to the shaft of the retracting spring drum 170; this governor is of the fly-ball type similar to those used in telephone dial mechanisms.

The transmitter is equipped with a start-of-message position control. This includes a knob 174, Figs. 2 and 5, which through a shaft 176 operates a gear 178, Fig. 10, that engages a rack 180 built into a shaft 182. The shaft, which is a cariage return stop rod, is fitted with a rubber tip 184 on the inside end thereof and serves as a bumper against which the pickup carriage comes to rest at the end of its return travel. This position is adjustable in steps of ½" as indicated on a graduated plate 186, Figs. 4 and 9, which is behind the control knob 174. A spring and detent mechanism 185, and 187 to 190, Figs. 9 and 11, is built into the control shaft 176 to insure a definite positioning of this control at each step. This mechanism includes a shaft 185 which carries a pin 190 that is slidable in the slot in the shaft 176 when the shaft 185 is pushed inwardly, as viewed in Fig. 9, against the compression spring 187. The pin 190 coacts with recesses 189 in the detent plate to retain the mechanism in any adjusted position. Limit pins 192 serve to limit the extent of rotation of the shaft 176. When the pickup carriage 122 comes to rest against the rubber-tipped bumper 184, Figs. 10 and 17, this bumper engages a lever 194 in the underside of the carriage. Lever 194 is pivoted about a shoulder screw bearing 196 and one arm of the lever operates a switch 198 to remove power from the half-nut retracting solenoid magnet 152 and allow the half-nut to engage the lead screw.

The transmitter is equipped with an end-of-message control, Figs. 1, 2, 4 and 13 to 15, which allows the operator to preset the point at which scanning of the message will terminate and the carriage 122 return to its starting position. The knob 200, Fig. 2, through a shaft 201, turns a sprocket wheel 202 over which passes a chain 204, and this chain after passing over an idler sprocket 206, Fig. 1, at the opposite end of the loop, has both ends fastened to a movable carriage 208, Fig. 4. This carriage travels back and forth on two parallel rails 210, Figs. 1 and 2; a pointer 209, Fig. 4, attached to the carriage indicates at what point along the message cylinder 26 scanning will cease.

A sliding plate 212, Figs. 13 to 15, is mounted to a vertical member 214 of the end-of-message carriage 208 by two shoulder screws 216 through slots, and provided with such clearance as to allow the plate 212 to slide freely over a distance of about one-quarter of an inch. A spring 218 on the rear of the support 214, Fig. 15, is fastened to a pin which is integral with the sliding plate 212 and protrudes through a slot in the support 214, and maintains the sliding plate 212 normally to the left as viewed from the rear in Figs. 13 and 14, and to the right as viewed in Fig. 15. The two cams 220, Figs. 13 and 14, are mounted on the face of the sliding plate 212, which cams normally rest and are held against stop pins under the action of springs 222. These cams are provided with protruding arms 223 and 224, one of which protrudes upwardly and the other downwardly. Between the adjoining faces of the two cams is a long horizontal sliding push rod 226. When this rod is moved to the right as viewed in Figs. 13 and 14, the right end of the rod pushes on the arm 228, Fig. 1, of a snap action switch 230 mounted beneath the cylinder driving motor 24. Actuation of this switch stops the transmitter.

The automatic action of moving the push rod 226 is as follows: On the front side of the scanning carriage is a plate 232, Fig. 4, fitted with two trip pins 234, protruding from the surface, Figs. 4 and 14; as the scanning carriage moves along the rails, when the point is reached where scanning is to cease, these two trip pins 234 engage the arms 223 and 224 of the two cams 220, and the cams turn in opposite directions and pinch the push rod 226 between them, as seen in Fig. 14. The continued movement of the scanning carriage causes the moving plate 212 to slide forward, carrying the push rod 226 (in the direction of the arrow) with it, and the push rod actuates switch 230, Fig. 1, thereby shutting down the transmitter. The scanning carriage then stops, the half-nut on the carriage is retracted and the carriage returns to its starting position. This releases the action of the cams, and the push rod, under the action of a spring 238, Fig. 2, re-turns to its normal position as does also the sliding plate 212 on the end-of-message carriage 208.

A motor-adjusting stud 240, Fig. 3, fitted with clamping nuts above and below a motor mounting plate 242, serves to accurately align the motor shaft with the axis of the message cylinder. A reject push button 244, Figs. 1 and 3, provides a means for stopping transmission at any time after scanning of the message has started. A rubber-covered bumper 246, Figs. 2 and 5, serves as a stop for the transmitter gate 50 when in its open position, shown in Fig. 5.

Fig. 18 is a schematic of a simplified control circuit which may be used when one transmitter unit alone is employed, instead of two or more such units successively operative as disclosed in the aforesaid Pollard et al. application. The upper portion of the figure shows diagrammatically, from left to right, the line feed motor 118, cylinder-driving motor 24, reject push button 244, push rod 226 which opens the end-of-message switch 230, transmitter gate lock magnet 74, switch 198 operable by the return of the pickup carriage to the start-of-message position, solenoid magnet 152 which is embodied in the half-nut retracting mechanism, and snap switches 72 and 70 which are controlled by the transmitter gate. The cylinder-driving motor 24 has a brake drum and a brake arm which bears against the drum at all times when there is no power applied to the motor; when power is applied it simultaneously energizes a solenoid magnet 250 which retracts the brake arm and allows the motor and message cylinder to revolve freely.

Three relays 252, 254 and 255 are provided: Relay 252 is under the control of relay 254 and is of the slow-operating type to enable a phasing signal of predetermined duration to be sent prior to transmission of a facsimile message, and also to enable the cylinder-driving motor 24 to reach synchronous speed before the line feed motor 118 becomes effective to actuate the pickup carriage. Relay 254 is under the joint control of relay 255 and snap switches 70 and 72; and relay 255 is under the joint control of relay 252 and the switch 70. The blades of the switches 70 and 72 are shown in the positions which they occupy when the gate is open; both blades are actuated to the left when the gate is closed. The switch 70 which is controlled by the rear portion of the transmitter gate or door 50, as seen in Figs. 2 and 5, prevents restarting of the transmitter until after the gate has been swung open and reclosed, so that if the thumb latch on the gate should be partly released accidentally the machine would not inadvertently restart if the gate were reclosed.

With the transmitter gate open, a circuit is closed from negative battery, conductor 258, winding of relay 255, right hand contact and blade of switch 70, conductor 260, closed contacts of switch 230 and push button 244, and conductor 262 to positive battery. Relay 255 is operated and is locked up over a circuit comprising its inner make contact and armature, conductor 264, inner armature and break contact of relay 252, and conductor 262 to positive battery.

When the message to be transmitted has been inserted in the transmitting cylinder and the transmitter gate is closed and latched, the relay 254 is energized over a circuit comprising negative battery on conductor 258, winding of the relay, conductor 266, make contact and armature 2 of operated relay 255, closed switch 72, left hand contact and blade of switch 70, conductor 260, switch 230 and push button 244 to conductor 262 and positive battery. Relay 254 operates and locks up over its inner contact and armature to conductor 260. Armature 2 and the associated make contact of the relay connect a source of alternating current power supply to the cylinder-driving motor 24 and the brake solenoid magnet 250, the other side of the circuit comprising conductor 268. Relay 254, by means of its armature 3 and make contact, closes a circuit through the winding of relay 252. The latter relay operates after a predetermined time delay, for example, two seconds, and at its armature 2 and make contact, closes a circuit to supply alternating current power to the line feed motor 118, whereupon a scanning operation is commenced. The slow-acting characteristic of relay 252 may be obtained by any of several methods known in the art, for example, by a dash-pot which controls the armatures or by an electrical delay or timing circuit associated with the operate winding of the relay. The operation of slow-acting relay 252, by means of its inner armature and break contact, opens the holding circuit 264 for the relay 255 and the latter releases. By means of its armature 3 and break contact the released relay 255 connects together conductors 270 and 271 which are in the circuit of the solenoid magnet 152, but the latter is not energized since the circuit is open at the break contact and armature 3 of energized relay 254.

The relay 254 has a transfer armature 4 and break contact which, before the relay operates, control amplifier circuits indicated diagrammatically by the rectangle 270 to cause a stand-by signal normally to be transmitted over the line to the recorder in the manner set forth in the aforesaid Pollard et al. application. The operation of the relay 254, by means of its armature 4 and break contact, causes the amplifier circuits to discontinue the stand-by signal, and by means of the armature and make contact controls the amplifier circuits to effect transmission of phasing signals to phase the recorder. Relay 252 has a transfer armature 4 and break contact which upon operation of the relay after the two second interval, causes the amplifier circuits to discontinue the phasing signal, and when the armature 4 engages its make contact the facsimile message signals from the pick-up photocell are transmitted over the line. The impulses generated by the phasing photocell due to the gap in the message blank are now effective as blanking impulses and render a modulator intermittently non-conductive so that marking signals are not transmitted during the intervals when the gap in the message blank is scanned by the pick-up photocell that generates the facsimile signals.

When the end-of-message mechanism becomes operative, the push rod 266 actuates the blade of end-of-message switch 230 to open the switch and this opens the locking circuit 260 for the relay 254 which restores. By means of its armature 3 and make contact the relay releases relay 252, and by means of its break contact the relay energizes the solenoid 152 which retracts the half-nut of the line feed mechanism and enables the pick-up scanning carriage to be returned to its starting position by operation of the carriage return retracting belt and spring drum. The transfer circuits through armatures 4 of relays 252 and 254 are restored to normal. The release of relay 254 also deenergizes the transmitter gate locking solenoid 74. With the pick-up carriage returned to the start-of-message position, the switch 198 is opened, thus opening the circuit through the solenoid 152 so that the half-nut is again effective. The switch 230 is restored by the action of its biasing spring 231 so that it is again in position to be opened by the push rod 226 at the end of the next scanning cycle.

If the reject push button 244, which is of the non-locking type, is actuated by an attendant during a scanning operation, this opens the locking circuit 260. This results in release of the half-nut of the scanning mechanism and the return of the pick-up carriage and restoration to normal of the circuit in the manner above described with reference to the actuation of the end-of-message switch 230.

It is to be understood that various modifications of the foregoing apparatus will readily suggest themselves to those skilled in the art without departing from the spirit of the instant invention. For example, the inner end of the transparent cylinder 26 preferably is held within the flange member 28 by a tight fit only, so that the cylinder may be removed readily for cleaning or other purpose whenever desired, but the inner end of the cylinder may, if desired, be secured to member 28 by any suitable fastening means. Similarly, the auxiliary pickup system for generating the phasing or other control signals may have the positions of the exciter lamp 92 and the photocell 106 reversed, that is, the photocell may be supported by the post 87 within the outer end of the cylinder and the exciter lamp may be positioned outside the cylinder generally in the manner illustrated with respect to the photocell. It will also be appreciated that various features of the scanning unit disclosed herein may advantageously be employed for recording on a light sensitive medium within the cylinder, with a modulated scanning light carried by the pickup carriage, and thus enable incoming facsimile signals to be recorded at high speeds directly on such a medium. For such use it will be understood that the scanning system comprising the lamp 92 and photocell 106 now employed for generating the control signals would not be required, although these elements will not interfere with recording on light sensitive mediums, and hence the scanning unit is adapted for operation as a transceiver. Preferably and as seen in Fig. 2 the housing 102 for the photocell 102 is positioned closed to the wall of cylinder 26, and the tube 94 and the lens within the tube are positioned at an angle away from the tube 158, thereby to prevent the light beam from the exciter lamp for the photocell 106 from entering the tube 158 and to prevent the scanning beam from the lens system 156 from affecting the photocell 106, but other methods for maintaining suitable separation between the respective lens systems obviously can be employed. The feature of an auxiliary scanning system for generating phasing or other control signals during rotation of the cylinder by means of an exciter lamp and a photocell, one of which elements is positioned within and the other outside the cylinder, comprises the subject matter of certain claims in a prior copending patent application of Raleigh J. Wise, Serial No. 261,560, filed December 13, 1951, and assigned to the assignee of the instant case.

What is claimed is:

1. A facsimile scanning unit comprising a cylinder having a transparent wall portion through which a rolled sheet may be optically scanned, said cylinder having an outer end through which the rolled sheet may be inserted with the sheet extending longitudinally along the transparent wall portion of the cylinder, a first bearing structure rotatably supporting the other end of the cylinder, means including said bearing structure for rotating the cylinder about its axis at a predetermined speed during a scanning operation, a rigid support mounted adjacent to said outer end of the cylinder and a gate member for the outer end of the cylinder and mounted on said support, a second rotatable bearing structure carried by said gate member and adapted to engage the outer end of the cylinder and provide a rotatable bearing therefor when the gate member is in closed position with respect to the cylinder, said bearing structures coacting to prevent deviation in the axis of rotation of the cylinder, a facsimile scanning mechanism movable in a path substantially parallel to the axis of said cylinder, and drive means for advancing the scanning mechanism at a rate to effect scanning of the sheet during rotation of the cylinder.

2. Apparatus according to claim 1, in which the outer end of the cylinder is received within the rigid support, and said support extends circumferentially about the cylinder but is spaced therefrom a slight distance to enable the cylinder to rotate freely therein.

3. Apparatus according to claim 1, in which the gate member carries a freely rotatable bearing member mounted for limited axial movement towards and from the gate member, and means for resiliently urging said bearing member into supporting engagement with the outer end of the cylinder when the gate member is in closed position.

4. Apparatus according to claim 1, including a housing secured to the outer end of the gate member, bearings mounted within said housing and a freely rotatable shaft carried by said bearings, a live center plate secured to and carried by said shaft at the inner side of the gate member, a live center contact plate slidably mounted on the inner end of said shaft for limited axial movement towards and from the first named live center plate, and means positioned between said plates for resiliently urging the contact plate into supporting engagement with the outer end of the cylinder when the gate member is in closed position.

5. Apparatus according to claim 1, including manually operable latch means embodied in the unit for latching the gate member in closed position with respect to the cylinder, a locking member embodied in the unit and movable into locking position to prevent the gate member from being opened by operation of the latch means, and means including an electromagnet embodied in the unit for controlling the operation of said locking member.

6. Apparatus according to claim 3, in which the outer end of the cylinder and the freely rotatable bearing member have complementary tapering surfaces for engagement with each other to provide automatic alignment of the cylinder and bearing when the gate member is closed.

7. A facsimile transmitter unit comprising a message cylinder having a transparent wall portion through which a message may be optically scanned, said cylinder having an outer end through which a rolled transmitting message blank may be inserted with the blank extending longitudinally along the transparent wall portion of the cylinder, means including a first bearing structure rotatably supporting the other end of the cylinder, means including said bearing structure for rotating the cylinder about its axis at a predetermined speed during transmission of a message, a rigid support mounted adjacent to said outer end of the cylinder and a gate member for the outer end of said cylinder and carried by said support, a second rotatable bearing structure carried by said gate member and adapted to engage and provide a live bearing for the outer end of the message cylinder when the gate member is in closed position with respect to the cylinder, a scanning carriage movable in a path parallel to the axis of said cylinder, a light projection and pick-up photocell system carried by the carriage and drive means for advancing the carriage at a rate to effect scanning of the subject matter on the message blank and produce facsimile signals during rotation of the cylinder.

8. Apparatus according to claim 7, including electrical switch structure controlled by said gate member and actuatable thereby when the gate is closed for initiating a scanning operation.

9. A facsimile transmitter unit comprising a message cylinder having a transparent wall portion through which a message may be optically scanned, said cylinder having an outer end through which a rolled transmitting message blank may be inserted with the adjacent opposed edges of the rolled blank forming a gap extending longitudinally along the transparent portion of the cylinder, a first bearing structure rotatably supporting the opposite end of the cylinder, means including said bearing structure for rotating the cylinder about its axis at a predetermined speed during transmission of a message, a rigid support mounted adjacent to said outer end of the cylinder, a second rotatable bearing structure carried by said support and adapted to provide a live bearing for the outer end of the cylinder, a first scanning system comprising a carriage movable in a path parallel to the axis of said cylinder, an exciter lamp and a pick-up photocell carried by the carriage, drive means for advancing the carriage at a rate to effect scanning of the subject matter on the message blank and generate facsimile message signals during rotation of the cylinder, a second scanning system for generating control signals periodically during rotation of the cylinder and having a time duration determined by the width of the gap of said transmitting blank, said second scanning system comprising an exciter lamp and pick-up photocell one of which is positioned outside of the cylinder and the other of which is positioned inside of the cylinder and mounted on said rigid support.

10. A facsimile transmitter unit comprising a message cylinder having a transparent wall portion through which a message may be optically scanned, said cylinder having an outer end through which a rolled transmitting message blank may be inserted with the adjacent opposed edges of the rolled blank forming a gap extending longitudinally along the transparent portion of the cylinder, a first bearing structure rotatably supporting the opposite end of the cylinder, means including said bearing structure for rotating the cylinder about its axis at a predetermined speed during transmission of a message, a rigid support mounted adjacent to said outer end of the cylinder and a gate member for said outer end of the cylinder and mounted on said support, a second rotatable bearing structure carried by said gate member and adapted to engage and provide a live bearing for the outer end of the cylinder when the gate member is in closed position with respect to the cylinder, a first scanning system comprising a carriage movable in a path substantially parallel to the axis of said cylinder, an exciter lamp and a pick-up photocell carried by the carriage, drive means for advancing the carriage at a rate to effect scanning of the subject matter on the message blank and generate facsimile message signals during rotation of the cylinder, a second scanning system for generating control signals during rotation of the cylinder and having a time duration determined by the width of the gap of said transmitting blank, the elements of the second scanning system comprising a photocell and an exciter lamp therefor, one of said elements being mounted outside of the cylinder adjacent to the outer end thereof and the other of said elements being carried by said gate member so as to be positioned inside the cylinder when the gate is in closed position.

11. Apparatus according to claim 10, in which the mounting means for said one of the elements of the second scanning system which is mounted outside of the cylinder is adjustable to provide for orientation of the position of the element about the axis of the message cylinder.

12. Apparatus according to claim 10, including a rigid member which passes axially through said second rotatable bearing structure and is secured to the gate member, said rigid member extending into the outer end of the cylinder when the gate is in closed position and providing means for positioning said other of the elements of the second scanning system inside the cylinder.

13. Apparatus according to claim 12, in which said rigid member is hollow and provides a conduit for the electrical connections extending to said other of the elements of the second scanning system.

14. A facsimile transmitter unit comprising a message cylinder having a transparent wall portion for carrying a rolled transmitting message blank with the adjacent opposed edges of the rolled blank forming a gap extending longitudinally along the transparent portion of the cylinder, bearing structure rotatably supporting one end of the cylinder and means including said bearing structure for rotating the cylinder about the axis at a predetermined speed during transmission of the message, a rigid support mounted adjacent to the outer end of the cylinder and a gate member for said end of the cylinder and mounted on said support, a first scanning system comprising a carriage movable in a path parallel to the axis of the said cylinder, an exciter lamp and a pick-up photocell carried by the carriage, drive means for advancing the carriage at a rate to effect scanning of the subject matter on the message blank and generate facsimile signals during rotation of the cylinder, a second scanning system for generating control signals periodically during rotation of the cylinder and having a time duration determined by the width of the gap of said transmitting blank, the elements of the second scanning system comprising a photocell and an exciter lamp therefor, one of said elements being mounted outside the cylinder adjacent to said other end thereof and the other of said elements being carried by said gate member so as to be positioned inside the cylinder when the gate is in closed position.

References Cited in the file of this patent

UNITED STATES PATENTS

| Number | Name | Date |
|---|---|---|
| 2,469,423 | Wise | May 10, 1949 |
| 2,511,837 | D'Humy | June 20, 1950 |